United States Patent
Tennant

(10) Patent No.: US 12,255,455 B2
(45) Date of Patent: Mar. 18, 2025

(54) HYBRID GRID AND RENEWABLE BASED ENERGY SYSTEM

(71) Applicant: CONDUCTIFY LIMITED, Maidenhead (GB)

(72) Inventor: Robert Tennant, Maidenhead (GB)

(73) Assignee: CONDUCTIFY LIMITED, Maidenhead (GB)

( * ) Notice: Subject to any disclaimer, the term of this patent is extended or adjusted under 35 U.S.C. 154(b) by 392 days.

(21) Appl. No.: 17/800,566

(22) PCT Filed: Feb. 18, 2021

(86) PCT No.: PCT/GB2021/050405
§ 371 (c)(1),
(2) Date: Aug. 18, 2022

(87) PCT Pub. No.: WO2021/165688
PCT Pub. Date: Aug. 26, 2021

(65) Prior Publication Data
US 2023/0139514 A1    May 4, 2023

(30) Foreign Application Priority Data
Feb. 19, 2020   (GB) ........................... 2002293
Feb. 17, 2021   (GB) ........................... 2102250

(51) Int. Cl.
*H02J 3/00*   (2006.01)
*H02J 3/32*   (2006.01)
*H02J 3/38*   (2006.01)
*H02J 7/00*   (2006.01)

(52) U.S. Cl.
CPC .............. *H02J 3/004* (2020.01); *H02J 3/003* (2020.01); *H02J 3/32* (2013.01); *H02J 3/381* (2013.01);
(Continued)

(58) Field of Classification Search
CPC ........... H02J 13/00001; H02J 13/00002; H02J 2203/10; H02J 2300/10; H02J 2300/22;
(Continued)

(56) References Cited

U.S. PATENT DOCUMENTS 7,274,975 B2   9/2007   Miller
8,001,403 B2   8/2011   Hamilton et al.
(Continued)

FOREIGN PATENT DOCUMENTS

EP   2953230 A1   12/2015
EP   3247016 B1   6/2022
(Continued)

OTHER PUBLICATIONS

International Search Report of the corresponding International Patent Application, PCT/GB2021/050405, dated May 13, 2021, 5 pages.

*Primary Examiner* — Kidest Bahta
(74) *Attorney, Agent, or Firm* — Tucker Ellis LLP; Michael G. Craig

(57) ABSTRACT

A method for managing an energy system having one or more renewable energy sources, one or more energy storage devices, one or more loads, and a grid connection for connecting at least temporarily to an external energy distribution grid is disclosed. The method generates a prediction of energy demand of the loads using historical energy demand data, and a prediction of renewable energy availability from the renewable energy sources using weather forecast data. An amount of energy to be obtained from the distribution grid is determined in dependence on the prediction of renewable energy availability and the prediction of energy demand. An energy conservation strategy is generated using the predictions and determined energy amount, and energy supplied to one or more of the energy storage
(Continued)

devices and/or one or more of the loads is adjusted automatically according to the energy conservation strategy.

21 Claims, 6 Drawing Sheets

(52) U.S. Cl.
CPC ........ *H02J 7/0071* (2020.01); *H02J 7/00712* (2020.01); *H02J 2203/10* (2020.01); *H02J 2300/10* (2020.01); *H02J 2300/22* (2020.01); *H02J 2300/28* (2020.01)

(58) Field of Classification Search
CPC .............. H02J 2300/24; H02J 2300/28; H02J 2310/42; H02J 2310/60; H02J 3/003; H02J 3/004; H02J 3/14; H02J 3/32; H02J 3/381; H02J 3/466; H02J 7/0071; H02J 7/00712; H02J 7/007194; H02J 7/34; H02J 7/35; Y02A 30/00; Y02B 10/30; Y02T 90/167; Y04S 30/12
See application file for complete search history.

(56) References Cited

U.S. PATENT DOCUMENTS

| | | | |
|---|---|---|---|
| 8,260,469 B2 | 9/2012 | Gregory et al. | |
| 9,575,554 B1 | 2/2017 | Dow et al. | |
| 9,871,408 B2 | 1/2018 | Narita | |
| 10,326,305 B1 | 6/2019 | Jelinek | |
| 2010/0179704 A1 | 7/2010 | Ozog | |
| 2010/0222935 A1 | 9/2010 | Forbes, Jr. et al. | |
| 2010/0306027 A1 | 12/2010 | Haugh | |
| 2011/0125336 A1 | 5/2011 | Groves et al. | |
| 2011/0231028 A1 | 9/2011 | Ozog | |
| 2012/0319642 A1 | 12/2012 | Suyama et al. | |
| 2014/0129040 A1* | 5/2014 | Emadi | G06Q 50/06 700/291 |
| 2014/0337002 A1 | 11/2014 | Manto | |
| 2015/0073608 A1* | 3/2015 | Ippolito | G05F 1/67 700/286 |
| 2015/0186904 A1* | 7/2015 | Guha | G06Q 10/06316 705/7.26 |
| 2017/0237259 A1 | 8/2017 | Yoon et al. | |
| 2018/0175660 A1 | 6/2018 | Hara et al. | |
| 2020/0067347 A1* | 2/2020 | Jelinek | H02J 3/003 |

FOREIGN PATENT DOCUMENTS

| | | |
|---|---|---|
| WO | 2012057950 A2 | 5/2012 |
| WO | 2013100907 A1 | 7/2013 |
| WO | 2015099857 A1 | 7/2015 |
| WO | 2017221240 A1 | 12/2017 |
| WO | 2018156700 A1 | 8/2018 |
| WO | 2019098372 A1 | 5/2019 |

* cited by examiner

HYBRID GRID AND RENEWABLE BASED ENERGY SYSTEM

CROSS-REFERENCE TO RELATED APPLICATIONS

This application is a national phase application of International Application No. PCT/GB2021/050405, filed Feb. 18, 2021, which claims priority to Great Britain Patent Application Serial No. 2002293.5, filed Feb. 19, 2020, and claims priority to Great Britain Patent Application Serial No. 2102250.4, filed Feb. 17, 2021, all of which are incorporated herein by reference.

BACKGROUND

The present application relates to methods for managing energy systems having renewable energy sources. In particular, embodiments are directed to methods for meeting the demand of loads while limiting the consumption of non-renewable energy. In particular, the application relates to a system controller for managing the energy supplied to loads and energy storage devices of mobile energy systems.

The use of renewable energy sources is increasingly common in energy systems with a range of sizes, demand characteristics and functionalities. For example, large-scale wind and solar farms may supply electricity for regional and national distribution, while micro-generation sites may be used only for a much smaller number of local energy consumers. In these systems, renewable sources typically require integration with other types of energy sources such as power grids and generators as well as energy storage devices such as batteries. The nature of renewable sources means their energy output is often intermittent or cyclical, which can make managing the energy systems to satisfy demand a challenging task.

Some systems are managed by using short-term predictions to determine periods of insufficient renewable energy availability and responding by using connected non-renewable energy sources. While this type of approach is effective in meeting energy demand, it can lead to excessive consumption of non-renewable energy derived from fossil fuels, perpetuating environmental damage such as release of greenhouse gases. Furthermore, many such approaches are appropriate only for large, grid-connected systems as they cannot handle the more volatile characteristics of small and/or mobile systems.

Isolated energy systems such as recreational vehicles and boats have particular problems with reliably ensuring that energy demand is met, especially when they depend on renewable energy sources such as solar panels or wind turbines. These issues arise partly because such systems have fixed limited capacities at any given point and have changeable energy availability.

Even for grid-connected systems (e.g. residential buildings), there is often a desire to reduce reliance on grid-supplied power by making use of renewable sources such as solar panel installations, but existing systems do not always allow effective management of the available energy sources.

U.S. Pat. No. 7,274,975 discloses an integrated control device which manages the supply of energy from various sources (e.g., electric grid, battery, photovoltaic cells, fuel cells) and the demand for energy from consumption devices (e.g., hot-water heaters, HVAC systems, and appliances). An optimization algorithm determines based on various factors when to activate the energy sources and when to activate the consumption devices.

WO-A1-2015099857 discloses a technique creating a list of tasks each with associated power loads, where performance of the tasks is prioritised using predictions of renewable energy availability.

US-A1-20100306027 discloses a net-metering technique for deciding whether locally generated power should be sold to the grid or used to charge batteries.

US-A1-20110125336 discloses a controller for radio mast base stations which uses renewable energy predictions to maximise power transfer from a wind turbine to a battery, running a generator when there is insufficient energy availability.

US-B2-8260469, US-B2-9871408, WO-A1-2017221240, US-B1-9575554, US-A1-20100222935 and US-B2-8001403 all disclose techniques for managing power demand in grid-connected systems.

SUMMARY

Pursuant to the invention is has been appreciated that none of the above art effectively deals with the issues of efficient longer term availability of power in an isolated or largely off-grid system or in systems in which reliance on grid-power is to be minimised.

Aspects of the invention are set out in the independent claims and preferable features are set out in the dependent claims.

Disclosed herein is an energy system having one or more renewable energy sources, one or more energy storage devices, one or more loads, and a grid connection for connecting at least temporarily to an external energy distribution grid, the method comprising the steps of: generating a prediction of energy demand of the loads using historical energy demand data; generating a prediction of renewable energy availability from the renewable energy sources using weather forecast data; determining an amount of energy to be obtained from the distribution grid in dependence on the prediction of renewable energy availability and the prediction of energy demand; generating an energy conservation strategy using the predictions and determined energy amount; and adjusting energy supplied to one or more of the energy storage devices and/or one or more of the loads automatically according to the energy conservation strategy.

The energy conservation strategy may be configured to limit the amount of energy obtained from the distribution grid, optionally to minimise the amount of energy obtained from the distribution grid.

The prediction of renewable energy availability may be determined based on past observed energy availability data obtained for the renewable energy source(s). Generating a prediction of renewable energy availability may comprise: determining one or more prediction parameters for a given future time period using the weather forecast data; and determining an energy availability value for the given future time period based on the prediction parameters and based on the past observed energy availability data. The prediction parameters may comprise one or more of: one or more time parameters corresponding to the given future time period, such as one or more parameters indicating a season, month, and/or time of day; one or more weather parameters derived from the weather forecast data, for example one or more parameters indicative of cloud cover, sunshine duration or amount, or rainfall.

The method may comprise deriving the energy availability value from one or more past observed energy availability values associated with prediction parameter values corresponding to the determined prediction parameter values.

The method preferably comprises associating past observed energy availability values with respective buckets, each bucket associated with a respective range of one or more prediction parameters. The method may comprise identifying a bucket matching the determined prediction parameters, preferably one or more time and/or weather parameters corresponding to the given time and weather forecast data for the given time, and determining the predicted energy availability value for the given time based on past observed energy availability values associated with the identified bucket, optionally as a mean value of the associated energy availability values.

The method may comprise determining whether the identified bucket is associated with a threshold number of past observed availability values, and: if so, using the past observed availability values to determine a prediction; if not, using an alternative prediction method. The alternative prediction method may use a predetermined prediction model, preferably a predetermined prediction formula, and/or preferably does not use past observed energy availability data.

In preferred embodiments, the prediction of renewable energy availability can additionally or alternatively be determined using a predetermined prediction model, preferably a prediction formula. The method may select to use a predictive model based on past observed energy availability values or the prediction model based on a predetermined formula in dependence on one or more criteria, e.g. including availability of past observed energy availability values for a given time period and/or weather conditions. The model or formula is preferably parameterised by one or more configurable model parameters, preferably configurable via user input. The model parameters may include one or more weather parameters, preferably wherein each weather parameter is indicative of a degree of dependency of available renewable energy on a weather state. The weather states may comprise one or more of a season, a precipitation type and/or intensity, a wind level, and a sunlight level. Each weather parameter may be a value, a classification or a combination thereof.

The step of generating the prediction of renewable energy availability may comprise: providing the model parameters to the energy prediction model, wherein the renewable energy prediction model receives as input the weather forecast data and provides as output the prediction of renewable energy availability.

The method may further comprise the steps of: comparing the prediction of renewable energy availability with historical renewable energy data; and adjusting the model parameters based on the comparison of the prediction of renewable energy availability with the historical renewable energy data. The step of adjusting the weather parameters may be performed such that an error between the prediction of renewable energy availability and the historical renewable energy data is reduced or minimised. This can provide feedback to the renewable energy prediction model, allowing the model to learn and provide more accurate predictions.

The renewable energy prediction model may be a neural network or other machine learning model, trained using historical renewable energy data, historical demand data, and/or historical non-renewable energy data. Such data may be grouped into datasets, such as a demand dataset, a grid charge dataset, a wind charge dataset and a solar charge dataset. The demand dataset groups the power consumed according to the group of energy storage devices, the day of the week, and/or the hour of the day. The grid charge dataset groups the power delivered to charge energy storage devices by the group of energy storage devices from the grid (or other non-renewable sources), the day of the week, and/or the hour of the day. The wind charge dataset and solar charge dataset group the renewable power delivered by the wind generator and solar panels respectively according to the group of energy storage devices, the month, the hour, and the weather conditions.

The method may further comprise the steps of: performing an inference based on historical user inputs and historical circumstance data; and updating the energy conservation strategy based on the inference; wherein the historical circumstance data preferably comprises one or more of: historical energy demand data; historical weather data; and historical renewable energy data. The method may further comprise the step of updating the weather parameters based on the inference. This can allow the user's response to a particular set of circumstances to be learned, reducing or removing the need for the user to provide inputs to adjust the prediction model or energy conservation strategy in similar future situations.

In preferred embodiments, the method further comprises the steps of: receiving one or more inputs from a user via a user interface; and updating the energy conservation strategy based on the inputs received from the user. This can allow the energy conservation strategy and thus energy supplied to the devices and loads to account for a user's preferences.

Preferably, determining an amount of energy to be obtained from the distribution grid comprises determining the amount such that the energy obtained from the distribution grid and the energy obtained from the renewable energy sources as determined from the prediction of renewable energy availability together meet the predicted energy demand.

Generating the energy conservation strategy may comprise generating, based on the determined amount of energy to be obtained from the distribution grid, a charge plan for charging the energy storage device(s), the charge plan optionally specifying one or more charging sources and/or charging times for charging the energy storage device(s). The charge plan may specify one or more of: the amount of energy to be obtained from the external energy distribution grid for charging the energy storage device(s); a charging duration for charging the energy storage device(s) from the external energy distribution grid; and a time at which to perform charging of the energy storage device(s) from the external energy distribution grid.

The method may comprise determining the charge plan further based on one or more charging constraints, the constraints optionally comprising one or more of: a minimum charge level to be maintained for one or more energy storage devices; a required charge level to be achieved for one or more energy storage devices, preferably wherein the required charge level is to be achieved at least once in a given period, e.g. a day, the required charge level optionally comprising a full charge; one or more time windows during which energy may be obtained from the external distribution grid; and wherein one or more of the charging constraints are preferably user-configurable.

Generating the energy conservation strategy preferably comprises selecting, for a given load, an energy supply source to be used to provide energy to the load (e.g. at a selected future time or during a selected future time period), the supply source preferably selected as either the one or more energy storage devices or the grid connection. The adjusting step may then comprise controlling the energy system to provide energy to the given load from the selected supply source (e.g. at the selected future time or during the selected future time period).

While in this example, the selection is made between the storage devices and grid, in some embodiments, the renewable energy sources could also be selected as an alternative supply source. However, in many installations, the renewable sources may be used only to charge the energy storage devices (possibly together with the grid connection), rather than for direct supply, in which case the supply source selection is made between storage devices and grid.

The selection is preferably made in dependence on an energy supply constraint associated with the one or more energy storage devices. The energy supply constraint may comprise (or be selected based on) a power supply limit of a power inverter (or of multiple power inverters) adapted to supply electrical power to loads of the energy system from the energy storage devices. The energy supply constraint could alternatively or additionally be determined based on supply constraints of the energy storage device(s) themselves.

The selection is preferably made further in dependence on the prediction of energy demand, the method preferably comprising selecting one or more loads to which energy is to be supplied from the grid connection instead of the energy storage devices during a time when the predicted energy demand (e.g. instantaneous load/power) indicates a required power flow exceeding a power supply limit associated with the energy storage devices (e.g. associated with the inverter).

While the above techniques may be used to plan load shifting from energy storage devices to the grid connection in advance, alternatively or additionally, the method may include dynamically responding to a detected total load exceeding the energy supply constraint for the storage devices (or expected to exceed the energy supply constraint in the immediate future, e.g. in the next hour, five minutes, or one minute) by switching the supply source for one or more loads from the energy storage devices to the grid connection (e.g. immediately, at the time of detection).

The method preferably further comprises implementing the energy conservation strategy and/or the charge plan, preferably by controlling one or more loads and/or one or more energy storage controllers for controlling storage of energy to the energy storage devices and/or one or more power inverters for providing energy from the energy storage devices and/or energy input from the distribution grid based on the energy conservation strategy and/or the charge plan, wherein implementing the charge plan preferably comprises controlling one or more control devices to perform charging of the energy storage device(s) from the external distribution grid in accordance with the charge plan.

Implementing the energy conservation strategy preferably comprises controlling energy input from the distribution grid in accordance with the determined amount of energy to be obtained from the distribution grid, preferably to limit the energy obtained from the grid to the determined amount.

The step of generating the prediction of energy demand may be performed using a plurality of demand parameters. The step of generating the prediction of renewable energy availability may be performed using a plurality of weather parameters. The demand parameters may comprise one or more of the weather parameters. This can allow any dependency on weather of power usage to be accounted for in the prediction of energy demand. For example, if the temperature is very cold or very hot, the energy demand from heating or air conditioning systems may be likely to increase.

The prediction of renewable energy availability may include an energy output value for each renewable energy source individually or in combination, over a predetermined time period, preferably 24 hours. The prediction of renewable energy availability may include a temporal series of energy output values for each renewable energy source individually or in combination, over a predetermined time period, preferably 24 hours. An energy output value for a solar panel and/or a weather parameter may be adjusted based on the time of day and/or an orientation of the solar panel.

The method may further comprise the step of receiving one or more inputs from a user via a user interface. The inputs may be used to adjust the energy conservation schedule, charge plan, and/or the prediction model(s). The inputs may comprise one or more charging targets or constraints. The charging targets may comprise one or more time periods during which charging of at least one energy storage device is desired, and/or one or more values of the state of charge of the at least one energy storage device at which charging of the at least one energy storage device is desired to start or end.

The inputs may comprise one or more load-shedding targets. The load-shedding targets may comprise one or more state of charge values of the energy storage devices at or below which energy supply to one or more of the loads is interrupted and one or more state of charge values of the energy storage devices at or above which energy supply to the one or more loads is resumed.

The user interface may comprise one or more slidable controls for adjusting the charging targets and/or the load-shedding targets.

The inputs may comprise one or more of the weather parameters. The renewable energy prediction model may be updated based on the inputs received from the user.

In a further aspect (which may be combined with any of the other aspects or embodiments set out), the invention may provide a method for managing an energy system having one or more energy storage devices, one or more loads, and a grid connection for connecting to an external energy distribution grid, the method comprising the steps of: generating a prediction of energy demand of the loads using historical energy demand data; generating an energy conservation strategy using the prediction, wherein generating the energy conservation strategy comprises: selecting, for a given load, an energy supply source to be used to provide energy to the load, the supply source selected as either the one or more energy storage devices or the grid connection, wherein the selection is made in dependence on the prediction of energy demand and an energy supply constraint associated with the one or more energy storage devices, and adjusting supply of energy to one or more of the loads automatically according to the energy conservation strategy, wherein the adjusting step comprises controlling the energy system to provide energy to the given load from the selected supply source.

The energy supply constraint preferably comprises a power supply limit of a power inverter adapted to supply electrical power to loads of the energy system from the energy storage devices. The selection may be performed for multiple loads. For example, the method may comprise selecting one or more loads to which energy is to be supplied from the grid connection instead of the energy storage devices during a time when the predicted energy demand indicates a required power flow exceeding a power supply limit associated with the energy storage devices.

The method may comprise any of the further steps or features of the method as set out above.

Embodiments also provide a system having means, optionally in the form of one or more processor(s) with associated memory, for performing any method as set out herein and a non-transitory computer-readable medium comprising software code adapted, when executed by a data processing system, to perform any method as set out herein.

Features of the following embodiments may be combined with the embodiments described above.

Also described herein is method for managing an at least partially isolated energy system having one or more renewable energy sources, one or more non-renewable energy sources, one or more energy storage devices, and one or more loads, the method comprising the steps of:

generating a prediction of energy demand of the or each load using historical energy demand data, and generating a prediction of renewable energy availability from the or each renewable energy source using weather forecast data, the predictions extending at least 24 hours into the future such that the predictions include plural estimates of available energy at times at least, and preferably more than, 24 hours in advance; generating an energy conservation strategy using the predictions; monitoring real-time statuses of the energy system;

adjusting energy supplied to one or more of the energy storage devices and/or one or more of the loads automatically according to the energy conservation strategy;

outputting a measure of expected future energy availability to a user via a user interface; and receiving inputs for adjusting future or current energy storage or usage from the user via the user interface;

wherein the or each energy storage device is configured to be chargeable using one or more of the renewable energy sources and/or one or more of the non-renewable energy sources; and wherein the or each load is configured to receive energy supply from one or more of the renewable energy sources, one or more of the non-renewable energy sources, and/or one or more of the energy storage devices.

The method can allow energy systems to adapt in order to meet anticipated future demand while limiting consumption of non-renewable energy. In particular, the energy conservation strategy defines a flexible approach for allocating energy supply based on demand and generation predictions in order to make full use of any renewable energy available. Additionally, the predictions extending at least 24 hours into the future can enable longer-term planning for the energy system than conventional approaches, meaning the energy system can anticipate periods of limited renewable energy availability further in advance. This may allow renewable energy to be conserved more effectively. By advising a user of expected availability or by accepting user inputs, a tailored strategy can be adopted based on largely what the system has learned about usage patterns, weather and the user's own knowledge of intended future use. Alternatively, the method allows an energy system to be managed according to custom user requirements. Receiving inputs from the user allows the system to adapt its allocation of energy supply and charging to meet user needs, such as ensuring that particular loads are always powered or to consume energy at particular times of day for example to reduce costs.

A "partially isolated energy system" as used herein is preferably defined as an energy system having under normal operation a limited or non-permanent connection to a power grid or other means of distributed energy supply. Thus, an "isolated", "fully isolated" or "completely isolated" energy system may have no connection to a power grid under normal operation, although it is recognised that such systems may be operable to connect to a power grid or other means of distributed energy supply possibly by a connection having relatively limited current or power capacity in relation to peak load. Often, fully or partially isolated systems will be smaller in terms of their physical size, characteristic power rating and/or complexity of energy distribution than non-isolated systems. Many fully or partially isolated systems may also be mobile, in that they move or are moveable during operation. Examples of isolated or partially isolated energy systems include but are not limited to marine vessels, aircraft, recreational vehicles, campervans and agricultural systems, industrial/mining applications, humanitarian centres and military sites. The methods described herein may also be applicable to energy systems having a grid connection where the connection and/or the grid itself are unreliable, which include but are not limited to industrial/mining applications, humanitarian centres and military sites.

"Renewable energy sources" are preferably energy sources derived from renewable resources including but not limited to solar energy, wind, geothermal energy, tidal energy, hydroelectric energy and biomass. "Non-renewable energy sources" are preferably energy sources derived from non-renewable resources including but not limited to fossil fuels such as coal, oil and gas, and nuclear fuels. The term "energy storage device" as used herein preferably refers to any device capable of storing electrical energy, typically a battery.

"Historical energy demand data" as used herein refers to data relating to the energy demand of the loads of the energy system in the past, preferably indicating historical energy consumption of the loads. Preferably, the data extends at least 6 months, preferably no less than 1 year into the past. Historical energy demand data may include the energy or power required by one or more of the loads at points in time, either formatted individually for each load or aggregated across all of the system loads.

The real-time statuses may comprise one or more of a temperature, a fault condition, a state of charge of one or more of the energy storage devices, an energy output of one or more of the renewable energy sources, an energy output of one or more of the non-renewable energy sources, and an energy demand of one or more of the loads.

The energy conservation strategy may comprise one or more charging schedules for one or more of the energy storage device(s), wherein a given charging schedule comprises one or more charging set points to define when one or more of the renewable energy sources and/or one or more of the non-renewable energy sources are used to increase the state of charge of an energy storage device. The charging schedules can allow for informed charging of the energy storage devices to conserve energy consumption, for example during periods when renewable energy availability exceeds the total demand of the system.

The inputs received from the user via the user interface may comprise one or more charging targets, wherein the charging targets comprise one or more time periods during which charging of at least one energy storage device is desired, and/or one or more values of the state of charge of the at least one energy storage device at which charging of the at least one energy storage device is desired to start or end. This can allow the user to suggest specific times of day where charging is preferable according to their needs. For example electricity received from a grid may be cheaper at night, or the user may know that they will need more energy at a particular time of day. Accordingly, the energy storage devices can be charged to meet such needs. The charging targets may also allow the user to guide the charging of the storage devices such that their states of charge do not fall below a minimum value or continue to be charged above a maximum state of charge value. The values may be chosen to reflect the user's personal preferences, for example to prolong battery life or to ensure enough energy is stored to keep heating systems running all the time.

The "state of charge" or "state of charge value" of the energy storage devices as used herein may refer to a state of charge of an individual energy storage device expressed as a percentage of the energy storage device's capacity, or an overall state of charge expressed as a percentage of the combined capacity of two or more of the energy storage devices. This may allow decisions to be made for each energy storage device individually, for example when monitoring the lifetime of the devices or for targeted charging if the devices discharge unevenly. Decisions may also be made based on an overall combined state of charge, for example a total capacity value for the system or a subset thereof may be required in determining energy usage.

The charging set points may be determined by adjusting the charging targets according to the predictions. This may allow the user's preferences to be incorporated into a charging regime which is compatible with a forecasted energy availability and usage.

The charging schedules may be optimised such that the total amount of energy required from the or each non-renewable energy source to increase the state of charge of the or each energy storage device is reduced or minimised. Advantageously, this can reduce or minimise the amount of non-renewable resources consumed by the energy system, and thus its environmental impact. Furthermore, it can reduce dependency on any existing grid connections, lowering associated grid utility costs for the user. The optimisation of the charging schedules may also be used to extend the operating lifetime of the energy storage devices before they need to be replaced. The charging schedules may be optimised such that the lifetime of the or each energy storage device is extended or maximised. The charging schedules may be optimised such that the charging targets are altered minimally, preferably such that the charging set points are substantially the same as the charging targets. This may allow the user's preferences to be prioritised over environmental motives or efficiency, or may allow the degree to which the user's preferences are adjusted to be specified.

The energy conservation strategy may comprise a load-shedding strategy, wherein the load-shedding strategy preferably comprises interruptions of energy supply to one or more loads. The interruptions of the load-shedding strategy can allow the total load on the energy system to be reduced at times of limited stored or renewable energy availability. This may enable the demand to be satisfied without requiring additional non-renewable energy, and may allow the system to operate in an off-grid or fully isolated manner for an extended period of time, at least around 48 hours, preferably no less than 1 week. The loads whose energy supply may be interrupted may be classified into one or more groups or a list to indicate an order of priority in which their power supplies may be interrupted. For example, two such groups may be "critical" and "non-critical", wherein non-critical loads are non-essential to the basic operation of the energy system. Energy supply to such non-critical loads can be terminated without fear of system-wide failure and thus is interrupted before that of any critical loads. There may be a larger number of groups, or the loads may be individually prioritised into a list.

The inputs received from the user via the user interface may comprise one or more load-shedding targets, wherein the load-shedding targets comprise, for each of one or more of the loads, one or more values of the state of charge of the energy storage devices at or below which energy supply to the given load is interrupted and one or more values of the state of charge of the energy storage devices above which energy supply to the given load is resumed. This may allow the user to define their own priorities for interrupting energy supply according to their own needs. The value at or below which energy supply is interrupted may have a percentage difference of at least 5% less than the value above which energy supply is resumed, preferably no less than 10% less. This can avoid situations where power supply to a load is interrupted and resumed with a high frequency, by allowing the energy storage devices to regain a high enough state of charge such that the supply is not interrupted soon after resumption. The load shedding targets may be time-dependent, wherein different values of the state of charge of the energy storage devices are provided for different time periods for each load. This may allow the user to alter their priorities according to the time of day. For example, if a water heater is required in the morning, it can be assigned a lower state of charge value at which its energy supply is interrupted during the morning than it is during the rest of the day.

At least some of the interruptions may comprise planned interruptions, the planned interruptions defined by one or more load-shedding set points, wherein the load-shedding set points are determined by adjusting the load-shedding targets according to the predictions. This may allow the user's preferences to be incorporated into the load-shedding strategy such that it is compatible with a forecasted energy availability and usage. The load-shedding set points may be determined in advance by at least around 12 hours, preferably no less than 24 hours. This may allow the total load on the energy system to be reduced for periods of limited energy availability which are known or reliably predictable. Determining these planned interruptions well in advance can give the rest of the system time to adapt so as to provide minimal loss of functionality. For example, the charging schedules may be adapted to begin charging the energy storage devices such that non-renewable energy is not required at the time of the interruption.

At least some of the interruptions may comprise unplanned interruptions, the unplanned interruptions determined in response to unexpected system conditions, wherein the unplanned interruptions are preferably determined in advance by less than around 1 hour, preferably no more than 10 minutes. The unexpected system conditions may comprise one or more of: the state of charge of the energy storage devices being lower than expected, the temperature of one or more of the energy storage devices being above a safe operating threshold, the energy availability being lower than expected and a manual override from the user. The user may also create custom criteria which, if satisfied, result in the energy supplied to one or more of the loads being interrupted. This can provide a dynamic, short-term approach for dealing with unforeseen energy shortages, allowing the system to compensate for discrepancies between the predicted and measured energy availabilities, and to respond to any abnormal or extreme conditions.

The method may further comprise the step of outputting the energy conservation strategy to the user via the user interface. The method may further comprise the steps of receiving one or more amendments to the energy conservation strategy from the user via the user interface, and modifying the energy conservation strategy according to the or each amendment. This may allow the energy conservation strategy to be customisable according to the user's needs and preferences. Advantageously, the user can configure and dynamically manage selected circuits or individual devices or loads within their environment. The method may further comprise the step of receiving approval of the suggested energy conservation strategy from the user via the user interface. This gives the user the option to use the strategy proposed by the method, or to implement custom changes. The method may further comprise the step of outputting the energy conservation strategy to the user via the user interface a predetermined time period, e.g. at least 10 minutes, preferably no less than 1 hour, before each interruption to the energy supply of a load. The amendments may comprise one or more amendments to the load-shedding targets such that an imminent interruption is delayed or avoided. This can allow the user to be warned of any interruptions, and may give them the option to reschedule or prevent the interruption according to their needs or preferences.

The method may further comprise the step of measuring a performance of at least one renewable energy source and/or load, wherein the step of generating the prediction of energy demand and generating the prediction of renewable energy availability is performed using the or each measured performance. Measuring and comparing performances may provide feedback for the prediction generation, allowing the demand and renewable energy predictions to become more accurate and any decision making to become better informed. The method may further comprise the step of storing on a database the rated performances and/or one or more analyses, wherein the analyses receive as input one or more of the measured performances. The database may store data received from sensors in the energy system. One or more of the analyses may receive as input one or more of the rated performances, and perform comparisons between the measured and rated performances. Preferably at least one analysis may evaluate the performance of one or more of the energy storage devices by monitoring the energy storage capacity of the one or more energy storage devices.

At least one of the analyses may be defined by the user via the user interface. These may be custom analyses to be stored on the database. The analyses may provide their output to the user via the user interface. This can allow the user to receive a range of standard and custom analyses regarding the operation of the energy system. For example, comparison of actual renewable energy generated with that predicted allows the user to adjust parameters to improve the accuracy of the weather prediction. Similarly, analysis of the state of charge of the energy storage devices and the total energy coming in and out of the system over time allows the user to assess whether the current energy conservation strategy is too aggressive or too lenient. Adjusting the energy conservation strategy using this tool may allow optimisation of the use of grid power or maximising the lifespan of the energy storage devices.

The method may further comprise the step of, for a given one of the energy storage devices, regulating the temperature of the energy storage device using a temperature prediction and the corresponding real-time status comprising a temperature, wherein the temperature prediction is generated using one or more of the prediction of energy demand, the prediction of renewable energy availability, the weather forecast data, the real-time statuses and historical energy storage device temperature data. Advantageously, this may prevent the temperature of the energy storage devices from becoming too high, reducing the risk of fire or damage to components of the energy system.

The method may further comprise the step of alerting the user via the user interface if at least one of the real-times statuses satisfies one or more alert criteria, wherein the alert criterion for each real-time status comprises at least one threshold value, range of values and/or status category. This can allow the user to be alerted of any issues, particularly those which require user actions or authorisation to be resolved. The alert criteria may be modified by the user via the user interface in real-time. This can provide flexibility to the system, allowing the user to modify and remodify the characteristics of the energy system according to their needs or preferences.

The energy system may be operable to connect to additional renewable energy sources, non-renewable energy sources, energy storage devices, and loads while the energy system is operational. This can allow the energy system to be modular, meaning the structure, functionality and size of the system can be adapted while existing components continue to operate. For example, renewable energy sources such as solar panels can be arranged into banks and can be connected in series or parallel or both. Each bank may have at least one sensor, for example to measure current and voltage. Similarly, energy storage devices may be grouped to form up to around three groups with any number of devices in each group connected in series or parallel. Each group may have at least one sensor, for example to measure temperature or current or voltage.

The energy system may comprise chargers for charging the energy storage devices from the renewable and non-renewable energy sources. The number of chargers may be determined by the power output of each of the energy sources. A temperature sensor, an alternating or direct current/voltage sensor and a controller may be associated with each charger. Each charger may be associated with an energy storage device or a group of energy storage devices.

The energy storage devices may comprise one or more batteries. The energy system may be completely isolated. The energy system may be mobile. The non-renewable energy sources may comprise at least one generator.

The method may further comprise the step of aggregating the measured and predicted energy demands for the energy system with the measured and predicted energy demands of one or more other energy systems. The other energy systems may be energy systems located geographically close to the energy system, preferably which are also at least partially isolated. Advantageously, this can allow aggregated data to be provided to users or other parties, which may be used to manage energy systems or networks of systems more effectively. For example, a user may use regional renewable energy generation data as a benchmark when managing their own system, and they may make decisions such as changing charging schedules in order to improve the system performance. Equally, aggregated residential consumption data may provide greater certainty of expected demand for utility providers, allowing them to reduce their spinning reserve and thus power generation costs.

The step of adjusting energy supplied may comprise the steps of, for each of the one or more energy storage devices and/or the one or more loads, sending a control signal to a controller to provide power to a switching device such that the switching device is enabled or disabled in order to activate or deactivate an energy supply to the device or load. The switching device may be an analogue or solid state relay. One or more of the control signals may be sent from a system controller via a bus. One or more of the control signals may be sent from a system controller wirelessly. One or more of the actuating devices may be an actuator coil.

The energy system may be at least intermittently connectable or connected to an external energy distribution grid and the energy system may be configurable to obtain energy from the distribution grid for supply to one or more energy storage devices and/or loads, and the method may comprise the step of determining an amount of energy to be obtained from the distribution grid in dependence on the prediction of renewable energy availability and/or the prediction of energy demand, the method preferably comprising the step of determining the energy conservation strategy also in dependence on the determined energy amount. The method in this aspect may be combined with the preceding aspect set out above.

According to another aspect, there is described herein a system controller for managing an at least partially isolated energy system having one or more energy storage devices, one or more renewable energy sources, one or more non-renewable energy sources and one or more loads, the system controller comprising a central processing unit for running:
- a prediction engine for generating predictions of energy demand and renewable energy availability;
- a supply control unit for selecting which renewable energy sources and which non-renewable energy sources are connected to supply energy to the loads and/or the energy storage devices; and a demand control unit for selecting which loads and energy storage devices are connected to receive energy supply.

As noted above, embodiments can enable energy demand to be met while limiting the amount of non-renewable energy consumed. The prediction engine, supply control unit and/or demand control unit may be provided by a single control device (e.g. a programmed processor) or by multiple separate control devices.

The system controller may communicate with the energy system via one or more buses, wherein the or each energy storage device, the or each renewable energy source, the each non-renewable energy source, and the or each load each comprises a controller connected to one or more sensors and one or more relays. The sensors may include a temperature sensor, a direct or alternating current sensor, or a direct or alternating voltage sensor. The one or more buses may only be used for communication between the system controller and the energy system. The one or more sensors may be local to their associated energy storage device, energy source or load. Using a bus for communication between the system controller and the energy system devices may allow the amount of wiring to be reduced. It avoids the need to run power cables and multiple communication cables from the controller to the energy system components.

The system controller may further comprise a network interface operable to communicate with a server via a data network (e.g. the Internet) and memory, wherein the system controller is operable to receive weather forecast data from the server via the network interface and store the weather forecast data in the memory. This can allow the system controller to receive up-to-date data with which to generate predictions. The system controller may be operable to receive updates such as software updates or component specifications.

This can allow the system controller to receive up-to-date data with which to determine how to manage system components.

The system controller may be operable to receive inputs from a user via a user interface and the system controller may be operable to display real-time statuses of the energy system and historical energy demand data of the energy system via the user interface. The user interface may comprise a mobile user device, preferably connected to the internet. This can allow the user to effect instructions to and monitor statuses of the energy system remotely.

The system controller may be configured to send instructions to one or more of the controllers to activate one or more of the sensors, receive measured data from the sensors via the one or more buses, and store the measured data in the memory. The system controller may further comprise an analytic engine for performing analyses, wherein the analyses receive as input the predictions and/or data stored in memory. The output of analyses may be stored in the memory. One or more of the analyses may be inputted by the user via the user interface. One or more of the analyses may output results to the user via the user interface. This may allow the user to perform custom analyses in order to evaluate the performance of the energy system according to their needs.

The system controller may be configured to perform any method as set out above.

As used herein, means plus function features may be expressed alternatively in terms of their corresponding structure.

Any feature in one aspect of the invention may be applied to other aspects of the invention, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE DRAWINGS

Embodiments of the present invention will now be described by way of example only and with reference to the accompanying drawings, in which.

DETAILED DESCRIPTION

Figure 1A:
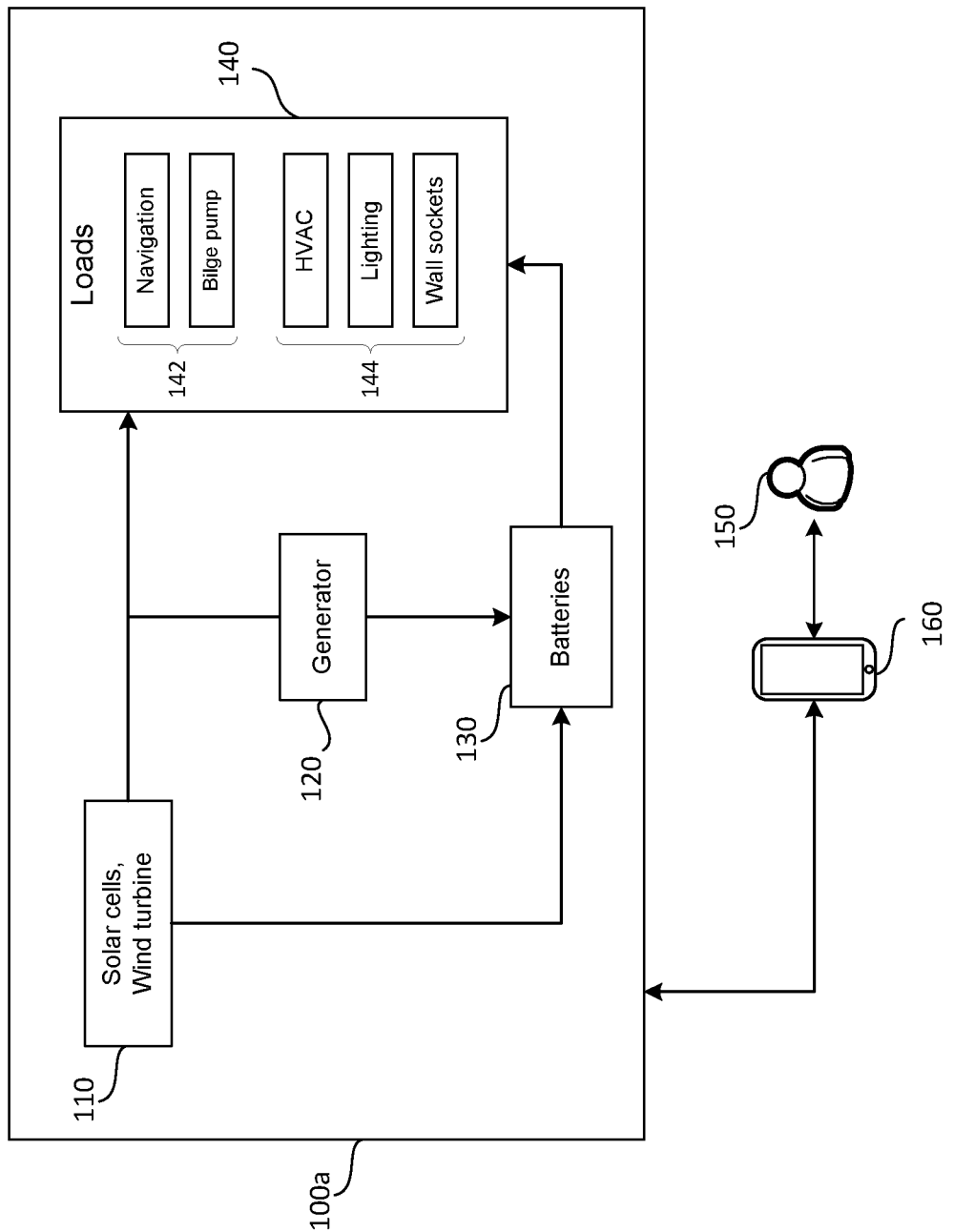
FIG. 1a shows a schematic diagram of a mobile isolated energy system.

Referring to FIG. 1a, a mobile isolated energy system 100a will now be described. The energy system 100a is preferably that of a boat such as a yacht. Such vehicles are commonly used for extended periods of time often in remote locations, and rarely have a grid connection. Therefore, they require the ability to function reliably under extended off-grid conditions.

The energy system 100a has renewable energy sources 110 which may include an array or arrays of solar cells and a wind turbine, and a non-renewable energy source 120 such as a generator. The generator 120 may be powered by hydrocarbon fuel such as diesel or petrol. The solar cells and wind turbine 110 and the generator 120 are configured to supply electricity to loads 140. The loads 140 include any component, process or sub-system of the system 100a which requires an energy supply. It is these loads which define the functionality of the system 100a. The loads 140 may be divided into a group of critical loads 142 and non-critical loads 144. Critical loads 142 are loads which are essential to a basic level of use and operation of the yacht, including navigation systems and bilge pumps. It is highly undesirable for power supply to be interrupted for the critical loads 142. Non-critical loads 144 are loads which are non-essential to the use and operation of the yacht, and therefore interruption to their power supply is permissible at least for short periods of time. Non-critical loads include appliances such as heating, ventilation and air conditioning systems (HVAC), cooking appliances and televisions; internal and external lighting units not required for navigation; and power sockets, which may be grouped further by location, function and/or power rating.

The renewable energy sources 110 and the generator 120 are also configured to supply electricity to energy storage devices 130, typically batteries including inverters to convert their direct current power to an alternating current output for the loads to use. The batteries 130 can be charged using the renewable sources 110 and/or the generator 120, simultaneously or individually. The batteries 130 are preferably lithium-ion batteries, but may be of other types such as absorbent glass mat (AGM) or lead-acid. The batteries 130 can also provide electricity supply to the loads 140. The loads 140 may receive an energy supply from any one or combination of the solar cells and/or the wind turbine 110, the generator 120 and the batteries 130.

A user 150 can communicate with the components of the system 100a via a user interface 160. Such communication may be performed wirelessly and/or via the internet, and the user interface 160 may have a touchscreen and/or may be a mobile user device such as a smartphone or tablet.

Figure 1B:
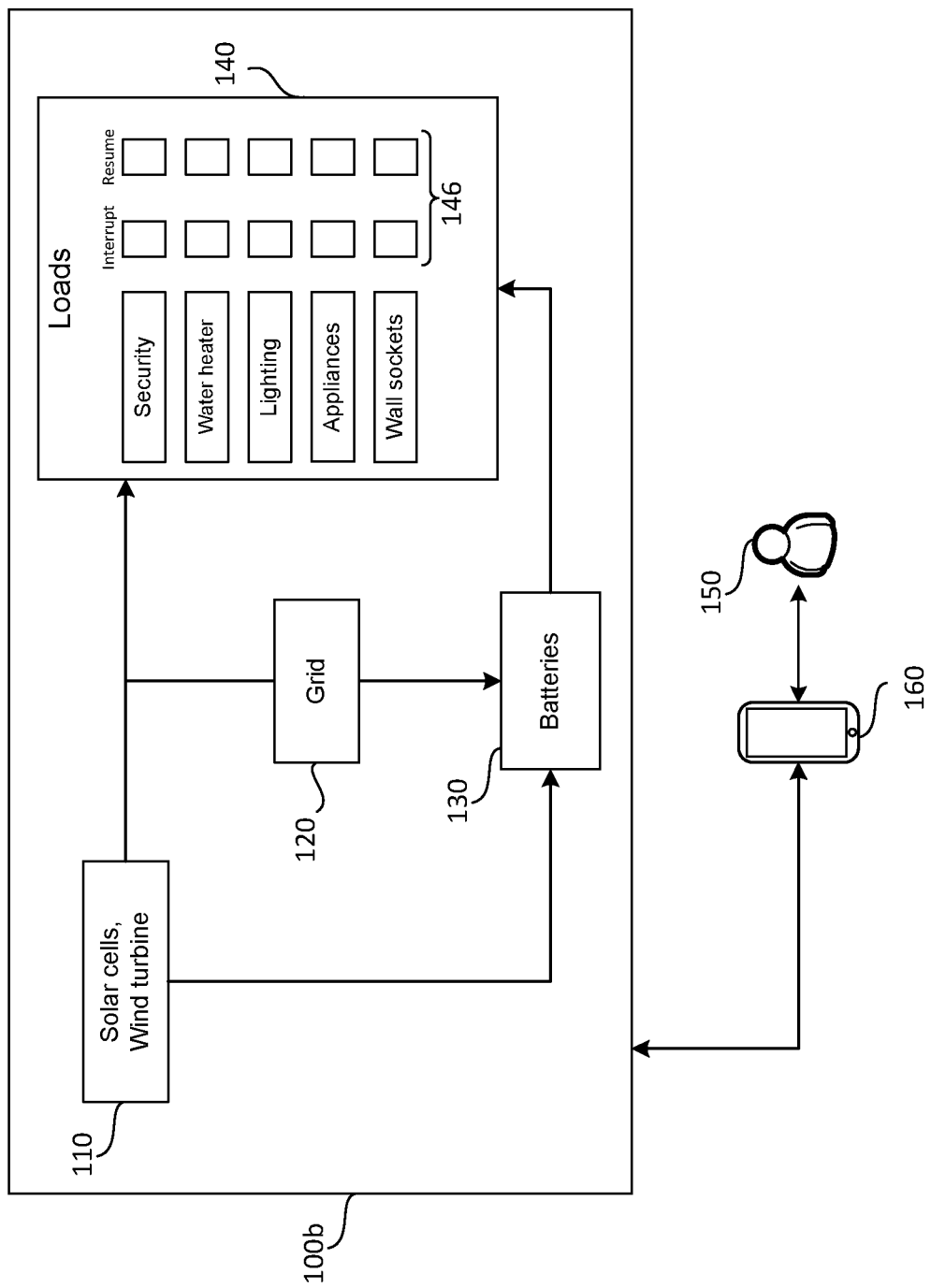
FIG. 1b shows a schematic diagram of a partially isolated energy system.

Referring to FIG. 1b, a partially isolated energy system 100b will now be described. The energy system 100b is preferably that of a residential environment having a limited grid connection. This may include housing where power shortages are common, or where consumption of renewable energy is preferred to and/or cheaper than that of grid-derived energy.

The energy system 100b differs from energy system 100a in that its non-renewable energy source 120 is a grid connection which may be limited. In one example, the grid connection is limited in the sense that it is not always available e.g. due to intermittent outages or because the system is part of a vehicle that is only connected to the grid at certain times. In another example, e.g. a domestic environment, the grid connection may be available permanently, but it may be desirable to reduce reliance of the system 100b on the grid connection by using renewable energy as much as possible for environmental or cost reasons. In such an example, energy received from the grid may be used only to charge batteries 130, meaning that loads 140 receive energy only from the batteries 130 (however, in other examples, consumption could be from the grid and batteries e.g. by falling back on the grid if the batteries are depleted).

Additionally, instead of classification into critical/non-critical categories, the loads 140 are prioritised according to targets 146 indicating the state of charge of one or more of the batteries 130, individually or in combination, at or below which each load's energy supply may be interrupted and other targets above which each load's energy supply may be resumed. Note that, although described in relation to different embodiments of the energy system, any of the described classification/prioritisation schemes may be used with any energy system embodiment.

Figure 2A:
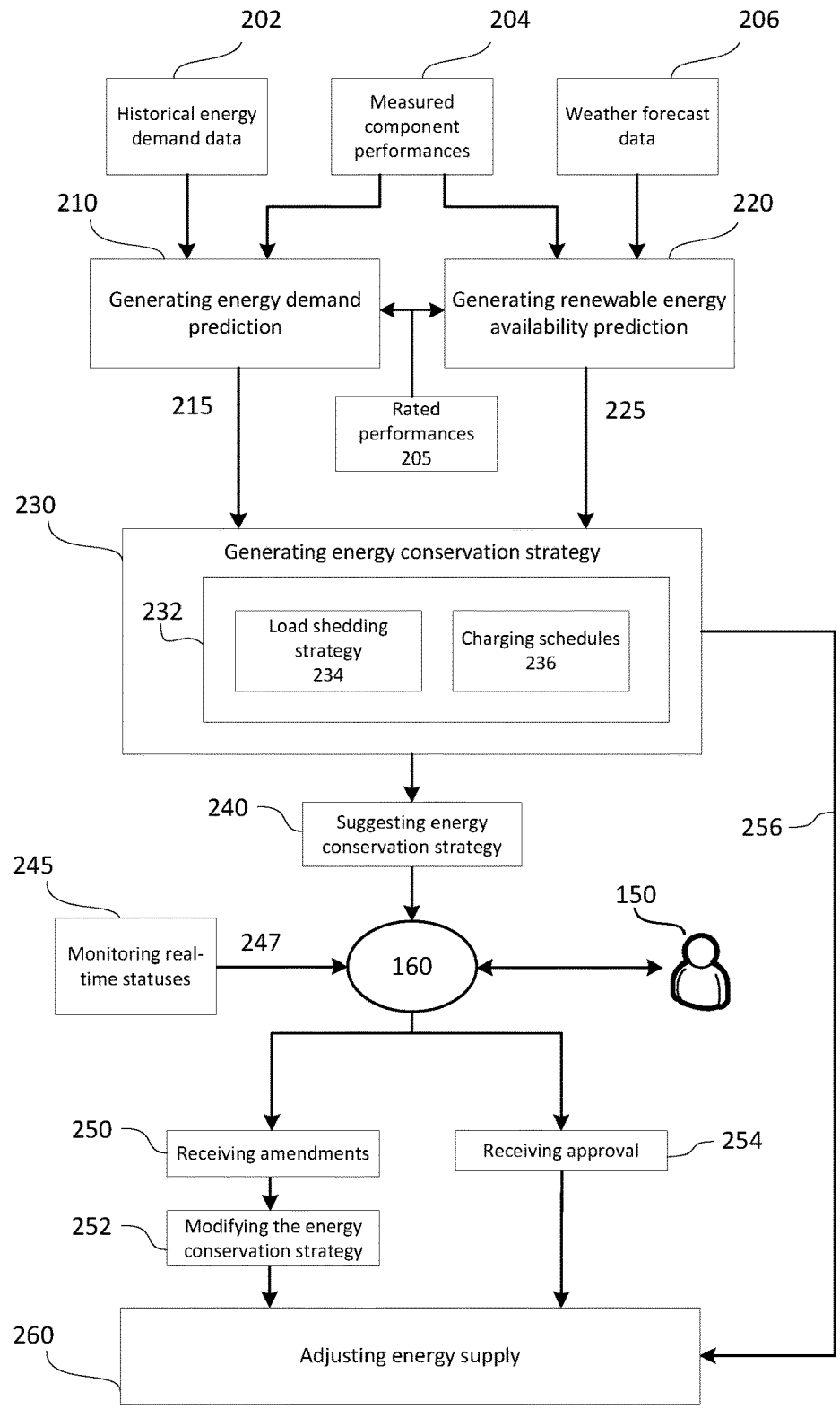
FIG. 2a shows a schematic diagram of a method for managing the energy system of FIG. 1a/1b.

Referring to FIG. 2a, a method 200 for managing an energy system 100 will now be described. The energy system 100 may correspond to either of the previous examples 100a, 100b. Historical energy demand data 202 and measured component performances 204 are provided to the step 210 of generating a prediction 215 of energy demand of the system 100. In generating 210 the prediction 215, the measured component performances 204 are analysed by comparing them with corresponding rated performances 205, providing feedback to the prediction process allowing it to learn. The measured component performances 204 may be expressed as one or more performance metrics and may include the energy generated by each renewable energy source 110, component temperatures, and the energy capacity (measured in Amp-hours) of the energy storage devices 130. Other types of analyses may be made, such as monitoring long-term trends of the system performance and how it may correlate to external conditions such as weather.

Similarly, the same or other measured component performances 204 and weather forecast data 206 are provided to the step 220 of generating a prediction 225 of renewable energy availability across all renewable energy sources 110. Again, the measured performances 204 are compared with rated performances 205. The predictions 215, 225 extend around 2 days to 5 days into the future, providing estimates of available energy and demand. The resolution of the predictions 215, 225 may in practice be limited by the resolution of the weather forecast data 206, but preferably provides estimates at 5- to 10-minute intervals.

In one embodiment, the generation 220 of the renewable energy availability prediction 225 is performed by a model based on at least the weather forecast data 206. The weather forecast data is combined with a model predicting an expected amount of available renewable energy in various different weather conditions. In a preferred embodiment, two alternative models are implemented. The first, referred to as the statistical model, uses past observed data concerning performance of the specific system in various conditions. The second uses a predetermined formula which may be adapted to the specific system by adjusting parameters of the formula. The following examples are described for a simple system with a single renewable source in the form of a solar cell installation but can be extended to more complex systems with multiple energy sources.

In the statistical model, data points defining past performance of the renewable source, e.g. specifically of a solar generation system, are grouped into buckets defined by distinct values or ranges of parameters. One or more parameters may be used to define a bucket. The one or more parameters defining each bucket may include time parameters, such as the month, day of the week, and/or time of day, a specific bank of renewable energy sources such as solar panels, and weather data such as cloud cover, rainfall, wind, snow, and/or temperature. Each bucket may have an equal temporal resolution (e.g. 3 hours) representing timeframes throughout the day, or the buckets may have different temporal resolutions in order to provide greater detail at critical times of day. The buckets may have equal or different resolutions with respect to the other variables. For example, buckets may be defined by month (e.g. May), by 3-hour time of day ranges such as 6:00-9:00, 9:00-12:00, 12:00-15:00 and 15:00-18:00, and, within each time of day range, by cloud coverage in 20% increments such as 0-20%, 20-40%, 40-60%, 60-80% and 80-100%. In other examples, buckets may alternatively or additionally be defined by the level of rainfall, such as 0-5 mm or greater than 5 mm. During operation, the system measures performance of the solar generation system, in particular observed power output for different weather conditions (e.g. cloud coverage, rainfall) at different times. Data points within the observed performance data are each assigned to one of the buckets based on the bucket parameters (time, weather conditions etc), which may be obtained from a weather service or may be locally measured. Thus, as the system operates, data points specifying actual power output are accumulated in the buckets corresponding to various times and weather conditions and can then be used to predict expected energy availability at future times based on the weather forecast data 206.

To determine the expected energy availability for a given time window, the system determines the expected weather parameters for that time window, e.g. cloud cover and rain fall, from the weather forecast data and accesses the bucket of past performance corresponding the time and weather parameters. For example, the weather forecast for the time period 7 am-10 am on a day in the month of April may indicate 30% cloud coverage and 3 mm rainfall. The system then looks up past performance data in the bucket corresponding to the parameters {April, 7 am-10 am, 20%-40% cover, <5 mm rainfall}. The specific parameterisation of the buckets may of course be adapted based on requirements and available data. A predicted energy availability for that time window is then determined based on the data points in the identified bucket, e.g. as the mean power output value of the data points in the bucket (assuming there are available data points in the bucket).

In a default configuration, a predetermined number of observed data points for the energy system 100 are required for the statistical method to be used to generate the renewable energy availability prediction 225 based on the observed data points. The predetermined number of observed data points may be one, or some number higher than one. One or more other criteria may be used additionally or alternatively to determine whether to use the statistical method to generate the renewable energy availability prediction 225. If there are no observed data points or an insufficient number of observed data points for the energy system 100 corresponding to the assigned bucket, the formulaic method is used to generate the renewable energy availability prediction 225 using the predetermined formula.

Predictions for individual time slots may be combined to produce an overall prediction of energy availability, e.g. for a day or other prediction period. In situations where some times of day have a bucket with sufficient observed data points and other times of day do not, the statistical method may be used for part of the overall prediction with the formula-based method used for the times where there are insufficient data points. Alternatively, the system could fall back on using the formula-based method for the whole period (e.g. day) in that case. Alternatively, the user 150 may select an alternative configuration, wherein the formulaic method is always used to generate the renewable energy availability prediction 225.

The statistical method determines, for each weather forecast data point, a prediction of renewable energy availability over the timeframe which the assigned bucket represents. The predictions corresponding to each timeframe are then combined to produce the renewable energy availability prediction 225 corresponding to the duration of the weather forecast data 206, for example 24 hours. Thus, the statistical method can be self-learning, and the accuracy of the prediction can be improved as time goes on and as more observed data points become available. This approach requires minimal user input. The prediction of renewable energy availability over each assigned bucket's timeframe may be a mean value of renewable energy availability of the observed data points in that bucket. However, other approaches for deriving a prediction from the observed values may be used. Where a mean value is used, the system may store a rolling mean for each bucket rather than storing all past data points.

As an alternative example, the statistical method may be implemented using another machine learning model such as a neural network which may be trained using historical renewable energy availability data and historical weather data and may be continuously updated or re-trained as more observed data points become available.

The step 210 of generating the prediction of energy demand 215 may be performed in a similar way, wherein timeframes within a desired duration of the prediction 215 are assigned to buckets, and the prediction in each bucket is determined based on one or more observed data points within that bucket, for example using the mean energy demand of the observed data points within that bucket. The predictions for each bucket are then combined to produce the prediction 215 of energy demand.

The formulaic method provides the weather forecast data 206 as input to a formula, the formula parameterised using weather parameters, to produce the prediction 225 of renewable energy availability over the duration of the weather forecast data 206, for example 24 hours, as a continuous or quasi-continuous signal. This can give smoother predicted energy profiles over the course of a day, which can require less extreme system responses. The weather parameters can represent relationships between the renewable energy availability and various states, such as the season, whether it is raining, cloudy, sunny, windy or snowing, or a property of the system 100 such as an orientation angle of a solar panel and other parameters determining the efficiency of the solar panel or other renewable source. The user may adjust the formula parameters e.g. based on the known characteristics of their specific installation. Each parameter may be a value, such as a factor between said weather state and the renewable energy availability, or may be a classification of the relationship, such as strong, weak, none or inverse. Buffer parameters, such as a wind buffer or a solar buffer, may also be used to parameterise the formula by providing degrees of uncertainty regarding the corresponding weather parameter values and their effect on the predictions.

The parameter values used in the formulaic method may be preconfigured, allowing the method to begin producing predictions without requiring initial user input. The user may then adjust the values in order to improve the predictions and account for specific characteristics of their system. Once a sufficient amount of observed data is available, the method 200 may automatically switch from using the formulaic method to using the statistical method for generating predictions 215, 225 based on past observed performance data of the solar panel or other renewable source (or the system may use a combination of both as described above).

Once the time period for which the prediction 225 relates has elapsed, the method 200 may compare the prediction 225 to the actual amount of renewable energy produced by the renewable energy sources 110, for example by displaying the predicted renewable energy availability and the actual renewable energy yield to the user 150. An error between the prediction 225 and actual renewable energy can be used to update the formula parameters used in the formulaic method, either automatically or by the user 150, in order to obtain more accurate predictions 225.

Where the method 200 is used for the energy system 100*b* or any such energy system which connects at least temporarily to an external energy distribution grid, an amount of grid-derived energy to be used for supply to one or more of the energy storage devices 130 or loads 140 is determined in dependence on the predictions 215, 225. This may allow systems to anticipate the amount of grid-derived energy required, enabling them to manage energy consumption more effectively, even with an unreliable and/or intermittent grid connection.

In one example, the system determines the total predicted demand 210 for a given time period, and subtracts the predicted renewable energy availability 220 for that time period from the total demand to determine the amount of energy that needs to be obtained from the grid 120 in order to meet the predicted demand. The system may add an additional amount as a safety margin in case renewable generation is lower than predicted.

The amount of grid-derived energy required may be determined by predicting a state of charge of the energy storage devices 130 over a predetermined time period using the predictions 215, 225. The amount of grid-derived energy required to supplement the renewable sources is then calculated over the predetermined time period based on the state of charge prediction and one or more constraints. The constraints may include a minimum allowable state of charge, requiring a full charge once a day, a maximum charge level, and/or time intervals where charging may occur. These constraints may be configured by the user 150. The grid-derived energy may be determined as the energy input required to adjust the predicted state of charge such that it satisfies the constraints. Determination of the grid-derived energy may be an iterative process of updating the state of charge prediction and the grid-derived energy prediction in order to satisfy the constraints. Thus, this can optimise the grid usage by minimising the amount of energy drawn from the grid. For example, if the weather forecast indicates good weather with plenty of sunshine and the predictions 215, 225 indicate low demand and high solar panel output respectively, then it can be determined that a lower amount of grid power will be required to supplement solar power in charging the batteries 130. By satisfying the constraints, this method can also allow battery health to be improved, for example by avoiding continued charging of the energy storage devices once they reach a full state of charge and avoiding the charge level falling below some minimum level.

The predictions 215, 225 are then provided to the step 230 of generating an energy conservation strategy 232. The energy conservation strategy 232 defines a regime for supplying power to the loads 140 and to the energy storage devices 130, either in a combined manner or separately, in order to meet energy demand while limiting non-renewable energy consumption. The amount of grid-derived energy as described above may also be used to generate 230 the energy conservation strategy 232. In particular, the energy conservation strategy may be arranged to ensure that energy drawn from the grid is limited (over the particular control/prediction time period) to the previously determined amount. When the conservation strategy is subsequently implemented, the system controls energy input from the grid such that the determined amount of energy (or no more than the determined amount) is drawn from the grid.

In the case of handling the power supply for the loads 140 and the energy storage devices 130 separately, the energy conservation strategy 232 can include a load-shedding strategy 234 and charging schedules 236. The load-shedding strategy 234 defines periods for which the power supplied to each non-critical load 144 is interrupted. These interruptions allow the total load of the system 100 to be reduced, thus maintaining basic functionality without requiring the use of the non-renewable energy sources 120. In situations where the maximum achievable load reduction for the system by interrupting power supply to non-critical loads 144 is insufficient for reducing the demand to meet the stored or renewable energy availability, non-renewable energy sources 120 are switched on to increase the overall energy availability and eradicate any power supply deficit.

The load-shedding strategy 234 includes planned interruptions and unplanned interruptions. Planned interruptions are determined by adjusting load-shedding targets according to the predictions 215, 225 to produce load-shedding set points which define the states of charge of one or more of the batteries 130, individually or in combination, at or below which the power supplied to each load 140 is interrupted and above which the power supplied to each load 140 is resumed, where the state of charge values given may be variable according to the time of day. The load-shedding targets are provided and may be adjusted by the user 150 via the user interface 160. For example, the user 150 may provide targets such that power supply to a water heater may be interrupted when the batteries 130 reach a state of charge of 25%, except between the hours of 4 am and 8 am, when the value is reduced to 10% to reduce the chance of a lack of hot water in the morning. These set points are planned at least around 24 hours in advance, and typically are used to account for periods of known or predictable insufficient stored or renewable energy availability, such as towards the end of the night or during the winter when sunlight may be limited.

Conversely, the unplanned interruptions are determined dynamically in response to current conditions. If an unexpected system condition occurs, such as the state of charge of the batteries 130 being lower than expected or the temperature of any component being above a safe operating threshold, the energy supply of one or more of the loads 140 may be interrupted. These interruptions are performed soon after (e.g. within around 15 minutes of) any triggering conditions, providing a short-term, on-the-fly response to unexpected situations. In some cases, such interruptions may be performed essentially immediately in response to detection of the trigger conditions. For example, if the RV breaks down, internal lighting or microwave power supply may be temporarily switched off in order to conserve battery power for heating and engine electrics while the vehicle is repaired. This also provides a means for compensating for any discrepancies between the predictions 215, 225 and real demands and availabilities. Load-shedding may be performed preferentially over using non-renewable energy sources 120 in times of renewable energy insufficiency.

The charging schedules 236 define when the batteries 130 are charged and from which energy source or sources they are charged. The schedules 236 include charging targets which define periods of time each day and/or state of charge thresholds where charging is preferred. Similar to the load-shedding targets, the charging targets are provided by the user 150 via the user interface 160 and may be adjusted by the user. The charging targets are adjusted according to the predictions in order to produce charging set points for defining when the batteries 130 can be charged. For example, the user 150 may provide charging targets indicating a preference to charge the batteries 130 during the night, when energy from a grid may be cheaper. If sufficient renewable energy generation is predicted for that day, then the set points will be created such that charging occurs during the day.

Where a grid connection is available (e.g. FIG. 1b), once the required amount of grid-derived energy has been determined as described above, the charging schedule can be configured to activate the grid supply at a suitable time to charge the batteries 130 from the grid. The system may determine a time duration for grid-based charging based on the required amount of grid-derived energy (e.g. the system may determine that 2 hours of grid-based charging is needed to achieve the required charge level). The time at which grid charging is performed may also be selected, for example based on expected charge level of the batteries at different times and/or based on energy availability and cost (e.g. using cheaper energy at night).

Note that in the FIG. 1b example, where sufficient energy is available from the grid and renewable sources 110 to achieve the predicted demand and meet battery constraints, load shedding may not need to be performed. Alternatively, the user may set a limit on grid-derived energy, in which case load shedding can be implemented as described in order to reduce consumption to within the total energy availability from grid and renewable sources combined.

In the partially isolated energy system of FIG. 1b, all loads 140 may draw energy from the batteries 130, with the grid connection 120 and renewable sources 110 used to charge the batteries (rather than for directly supplying loads). Energy supply from the batteries is via a power inverter (not shown) which converts the DC supply from the batteries to an AC supply suitable for use by the loads. Such inverters typically have a maximum power rating. To reduce cost, an inverter is often chosen which is able to support a typical average total load but not necessarily full peak load. For example, inverters with rated power capacities of 5-10 kW are commonly used, but that capacity could easily be exceeded by simultaneous use of a water heater, air conditioning system and clothes dryer (which may have peak loads around 5 kW each). To deal with this, in some installations, the biggest energy consumers (e.g. air conditioning systems, water heaters, clothes dryers etc.) may be wired directly to the grid connection to avoid overloading the inverter, meaning that only smaller loads (e.g. lights, sockets) which are wired to the inverter can benefit from renewable energy stored using the batteries. Even so, unexpectedly high combined load could still exceed the inverter power limit, causing failures.

In embodiments of the present invention, these problems can be further addressed using the described predictive generation of energy conservation strategies and/or dynamic control. In this approach, all of the loads 140 are connected to the batteries 120 via the inverter, but at least some of them can also be selectively connected directly to the grid 120, to draw power from the grid instead of the batteries. Only the larger energy consumers may be connected in this way, or alternatively all loads may be installed to be selectively connected to the batteries or the grid.

For dynamic control, the system may monitor the total load and switch one or more selected loads from the inverter/batteries to the grid connection if the total load exceeds (or looks likely to exceed in the immediate future) some power limit based on the inverter load rating (e.g. the limit may be set lower than the actual inverter capacity to provide a safety margin).

The generation of an energy conservation strategy can also be adapted to exploit the ability to select energy sources. In particular, the energy conservation strategy or load shedding strategy that is generated may include instructions to switch one or more loads from battery supply to grid supply (e.g. at one or more determined future times), instead of disabling the load(s) altogether. Thus, the load-shedding strategy referred to elsewhere herein may also include shifting one or more loads from battery supply to grid supply. When the energy conservation strategy is implemented, the system then controls energy supply to the loads as required, e.g. shifting particular loads from battery supply to grid supply at specified times. This allows the energy conservation strategy to meet energy demand and satisfy constraints on batteries and/or inverters while limiting consumption of grid-derived energy.

Load shifting decisions are typically based on the predicted energy demand at particular times, and the energy supply constraint (e.g. inverter capacity) associated with the energy storage devices. As an example, during a time of predicted high demand (e.g. where the instantaneous power draw would exceed the capacity of the inverter and/or batteries), one or more loads may be shifted from the inverter/batteries to the grid. At other times the same load(s) may be supplied from the batteries.

This can allow large consumers (e.g. a clothes dryer) to be run from the batteries when general demand is low and from the grid during high demand periods. This avoids the need to either prevent usage of such appliances during high demand periods altogether (through load shedding), or to permanently wire those appliances to the grid, preventing them from being able to use battery-supplied (and hence renewable) energy.

Other criteria such as renewable energy availability, user-specified constraints etc. may additionally be used for making load-shifting decisions (e.g. the system could shift specific loads to the grid from battery supply during predicted low renewable energy availability, e.g. poor weather).

Both load shedding and load shifting may be combined in the load shedding strategy, e.g. to disable some loads completely, while others are shifted to the grid (with yet others kept supplied by the batteries), e.g. such that total grid consumption remains within specified constraints whilst ensuring that the power drawn from the batteries does not exceed the power limit of the inverter.

Once generated, the energy conservation strategy 232 (charging schedule and/or load-shedding plan) is suggested 240 to the user 150 via the user interface 160, providing a measure of expected future energy availability. Real-time statuses 247 are monitored 245 and provided to the user 150 via the user interface 160. The real-time statuses 247 may include measured physical properties of components of the system 100, such as temperatures or relevant fluid levels of the batteries 130, loads 140 and sources 110, 120. Temperatures may be measured by temperature probes or thermocouples which, depending on their plurality and distribution throughout the system 100, may be configured to provide for each component a single temperature value (preferably a maximum). Alternatively, the probes may provide a number of temperature values, possibly for forming a heat map of at least one component. Fluid levels may be measured using multiple differential pressure sensors to increase the reliability of the measurements. The real-time statuses 247 may also include fault conditions for one or more components of the system 100. Such fault conditions may be represented by Boolean values or discrete fault types. For example, an electrical fault internal to a battery 130, load 140 or power source 110, 120 may be represented using a binary flag having the value of 0 or 1, or the electrical fault may be categorised according to the associated failure mode (e.g. open-circuit, short-circuit, symmetric, asymmetric), the location within the component and/or the severity of the impact on the component's operation. The real-time statuses 247 may further include values indicating the energy or power outputs of one or more of the sources 110, 120 and available energy or state of charge of one or more of the batteries 130, as well as the energy or power demand of one or more of the loads 140. A range of sensors may be used to detect, measure and/or relay the statuses 247 to a controller or processor.

In some embodiments, either one or more amendments to the energy conservation strategy 232 are received 250 from the user 150 via the user interface 160 and the energy conservation strategy 232 is modified 252 accordingly, or approval of the energy conservation strategy 232 in an unamended form is received 254 from the user 150 via the user interface 160. The amendments to the energy conservation strategy 232 may be to one or both of the load-shedding strategy 234 and the charging schedules 236, and may include modifications of the charging and/or load-shedding targets. The controller then automatically adjusts 260 the energy supplied to the batteries 130 and the loads 140 according to the energy conservation strategy 232.

In some embodiments, the method 200 uses the energy conservation strategy 232 directly for adjusting 260 the energy supply in a fully automated mode 256, wherein the energy conservation strategy 232 is implemented to adjust the energy supply without any amendments, approval or other types of interaction from the user 150.

The energy supplied to the batteries 130 and the loads 140 is adjusted 260 by sending a control signal or instruction via a bus to each controller associated with the loads 140 or batteries 130 (and where applicable, the grid connection 120) whose power supply is to be altered. The control signal instructs each controller to enable a switching device, such as a relay, to supply energy to a battery 130 or a load 140, or to disable a switching device, such as a relay, to interrupt the energy supply of a load 140. Each switching device is enabled or disabled by providing power to an actuating device such as an actuator coil associated with the relay.

Data, particularly the predictions 215 of energy demand, of the energy system 100 can be aggregated with those of a group of other systems. The other systems may be located geographically close to the system 100 or may be associated by a common network. The aggregated data is used to produce average statistics for the group energy systems, allowing the user 150 of the system 100 to compare the performance of their system with that of similar systems and to use this comparison to inform adjustments to the system 100 to improve its performance. The aggregated data also allows grid utility providers to predict more accurately the demand of a network of users, meaning the spinning reserve on the network can be reduced, which in turn reduces overall energy generation cost.

Figure 2B:
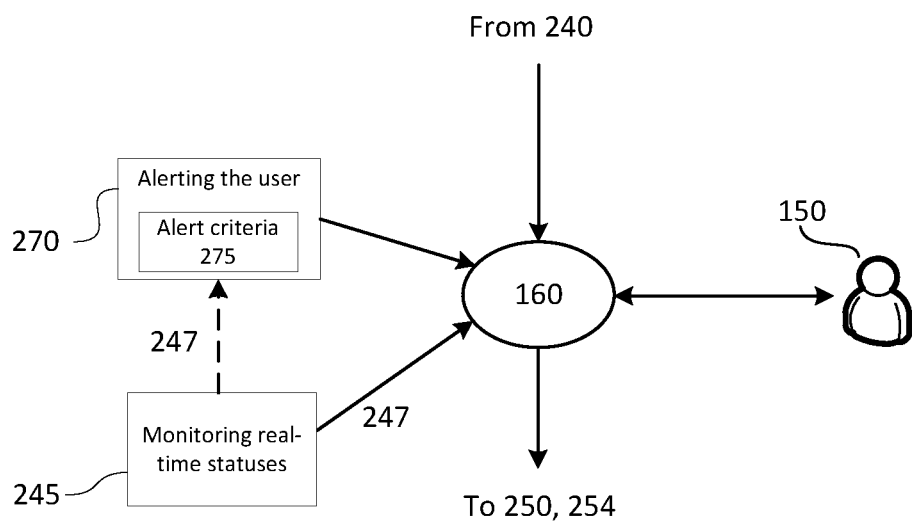
FIG. 2b shows a schematic diagram of a method for providing real-time alerts.

Referring to FIG. 2b, embodiments of the method 200 may include a method for providing real-time alerts which will now be described. The real-time statuses 247 of the system 100 are provided to a step 270 of alerting the user 150. The user 150 is alerted via the user interface 160 if at least one of the real-time statuses 247 satisfies alert criteria 275. Each alert criterion 275 is indicative of particular conditions, including at least one threshold value, range of values and status category. The alert criteria 275 are classified into three levels of alert: critical, warning, and information.

Critical alert criteria 275 include the temperature of a battery 130 exceeding a maximum safe value, the battery 130 charge or drain current exceeding maximum values, and whether a circuit of the system 100 has been tripped due to load-shedding. In response to critical alert criteria 275 being satisfied, the energy system controller takes automatic action to return to normal operation, typically by altering the power supply.

Warning alert criteria 275 include conditions being approached which will require action (either from the user 150 or from the system controller), such as the predictions 215, 225 indicating that a circuit will be tripped in 10 minutes, or the battery 130 temperature being within 10% of a maximum safe value.

Information alert criteria 275 include statuses such as whether the batteries 130 are charging, which charging phase the batteries are in, and which loads' power supplies are currently interrupted. Information alerts inform the user 150 of system statuses such as these, and can be suppressed by the user 150 at their discretion.

The alert criteria 275 are evaluated using the state of charge trip value, state of charge reset value, and set point time interval trip value of load circuits. The alert criteria 275 are also evaluated using the battery 130 state of charge start and end values, and float indicator of the sources 110, 120. The alert criteria 275 can be modified by the user 150 via the user interface 160 in real-time. The user can also override or postpone automatic system responses to alert conditions in real-time through the user interface 160. For example, overriding the automatic system response may include activating a kill switch, effecting the energy system 100 to operate without management or monitoring in a standalone or manual mode.

Figure 2C:
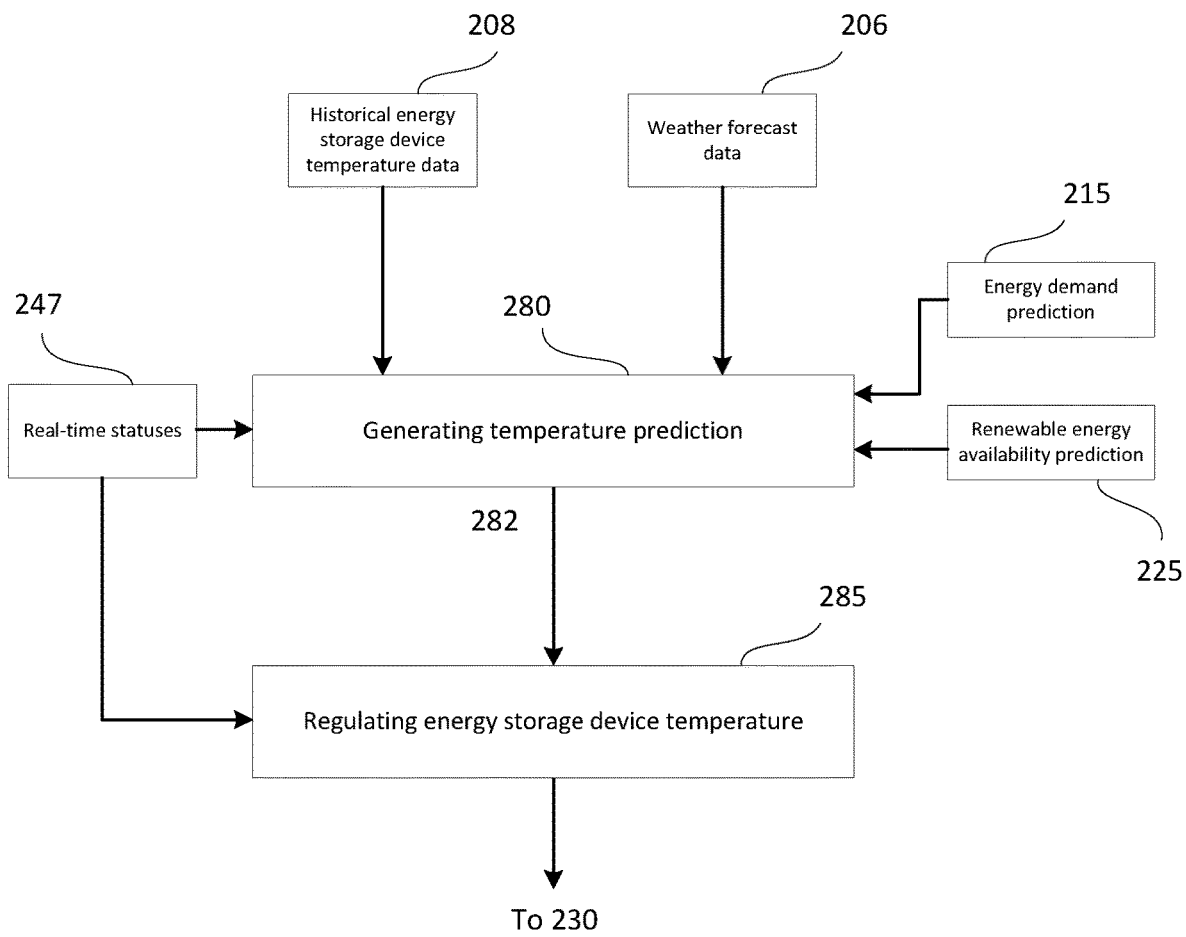
FIG. 2c shows a schematic diagram of a method for managing the temperature of energy storage devices.

Referring to FIG. 2c, embodiments of the method 200 may include a method for managing the temperature of energy storage devices which will now be described. In this embodiment, the method 200 further provides an approach for managing the energy system 100 while regulating the temperature of the batteries 130, which are often prone to over-heating. The demand prediction 215, the renewable energy availability prediction 225, the real-time statuses 247, the weather forecast data 206 and historical temperature data 208 of the energy storage devices 130 are provided to the step 280 of generating a temperature prediction 282 for each energy storage device 130. The temperature prediction 282 estimates the temperature of each battery 130 at points in time extending between 2 and 5 days into the future, similar to the range of the demand and energy availability predictions 215, 225. The predictions 215, 225 are used to predict the expected usage of each battery 130 across the relevant time period, particularly maximum drain and maximum charge values. Data such as these may be used alone or in combination with other data, such as weather forecast data, to generate 280 the temperature prediction 282. The temperature prediction will include at least identify time periods when the temperature of each battery 130 is expected to exceed a maximum safe operating temperature. Other parameters such as the reset temperatures of the batteries 130 may also be included in the prediction generation step 280.

The temperature prediction 282 and a corresponding real-time temperature 247 are provided to the step 285 of regulating the energy storage device temperature. The temperature is regulated 285 by determining amendments to the energy conservation strategy 232 which will constrain the use of the batteries 130 so that they do not overheat. Such amendments may include increased load-shedding or altered charging schedules 236. These amendments are provided as input to the step 230 of generating the energy conservation strategy 232.

Figure 3:
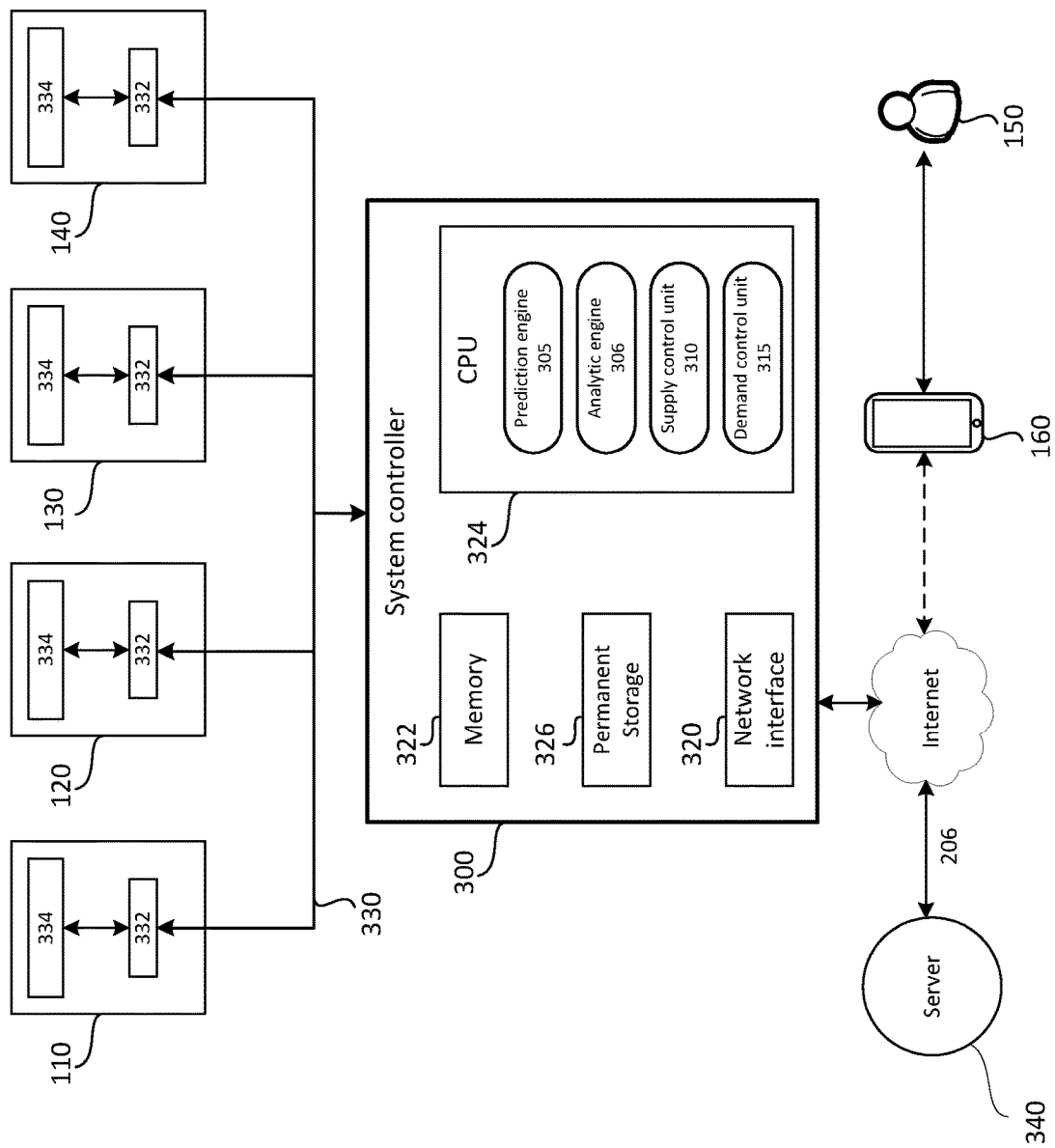
FIG. 3 shows a schematic diagram of a system controller for managing the energy system of FIG. 1a/1b.

Referring to FIG. 3, a system controller 300 for managing the energy system 100 (e.g. the isolated energy system 100*a* or partially isolated energy system 100*b*) will now be described. The system controller 300 comprises a network interface 320, a memory 322, a central processing unit (CPU) 324 and permanent storage 326 such as a disk or non-volatile solid-state computer memory such as FLASH memory. The CPU 324 is operable to run software modules, including a prediction engine 305, an analytic engine 306, a supply control unit 310 and a demand control unit 315 for implementing energy conservation strategies. The prediction engine 305 generates predictions of energy demand, renewable and non-renewable energy availability, battery temperature and other system statuses. The supply control unit 310 controls the renewable energy sources 110 such as solar panels and the non-renewable energy sources 120 such as generators or grid connections. The supply control unit 310 selects which energy sources 110, 120 are in use or connected at any given time, either for charging the batteries 130 or for supplying energy to the loads 140. Additional control hardware may be associated with the supply control unit 310, such as connections for sending and/or receiving control signals to and from the energy sources 110, 120, possibly via their own sockets or ports. The demand control unit 315 controls the energy demands of the batteries 130 and the loads 140. The demand control unit 315 manages the energy consumption of the loads 140 by selecting at any given point which loads 140 are connected or disconnected to receive energy supply from either the batteries 130 or the energy sources 110, 120. The demand control unit 315 also controls when the batteries 130 are connected to receive energy supply from the sources 110, 120 in order to be charged. Again, additional control hardware may be associated with the demand control unit 315, such as connections for sending and/or receiving control signals to and from the loads 140 and batteries 130, possibly via their own sockets or ports.

The supply control unit 310 and the demand control unit 315 both operate according to an energy conservation strategy, which dictates a strategy for ensuring that energy supply meets the demands of the system 100, while limiting the use of the non-renewable energy sources 120. The energy conservation strategy is generated by the prediction engine 305 using the generated predictions, and is provided to both the supply control unit 310 and the demand control unit 315. The system controller 300 communicates with the isolated energy system 100 to effect the control instructions outputted by the supply and demand control units 310, 315 through the CPU 324 via a system of buses 330. The buses 330 connect to the renewable energy sources 110, the non-renewable energy sources 120, the batteries 130 and the loads 140, each having a controller 332 and a network 334 of sensors and relays. The buses 330 provide sufficient bandwidth for the system controller 300 to communicate simultaneously with all components of the system 100 such that there is an insignificant or substantially inconsequential communication delay. Each bus 330 preferably operates at no less than around 300 kb/s and can support at least around 96 devices. As such, the system controller 300 can communicate with each component of the energy system 100 approximately every 13 milliseconds.

The system controller 300 uses the buses 330 to send control signals to one or more of the controllers 332, which in turn control relays for regulating energy supply to the components, and read analogue data from sensors and send the analogue data back to the system controller 300.

The system controller 300 uses the analogue sensor data as input to the analytic engine, which executes one or more analyses stored in the permanent storage 326. The analyses may be standard analyses or may be defined by the user 150 via the user interface 160. The analytic engine 306 may also access the memory 322 for shorter-term variable storage. The analytic engine 306 provides the output(s) of the analyses to the user 150 via the user interface 160.

A network interface 320 communicates with a server 340 via the internet in order to receive data such as weather forecast data 206 or other types of externally updated data such as software updates or component specifications. A copy of data received via the network interface 320 is stored in the memory 322, and in the permanent storage 326 for up to 1 year. Access to the memory 322 and the permanent storage 326 is provided to the CPU 324 of the system controller 300. The system controller 300 preferably provides at least around 6 GB of data storage.

The user interface 160 is used for receiving inputs from the user 150 and for displaying data to the user 150, such as real-time statuses, estimated and real energy demands, and estimated and real energy availabilities. In this particular example, the user interface 160 is a mobile user device connected wirelessly to the internet such as a mobile phone or tablet. Using its internet connection, the mobile user device 160 may communicate with the system controller 300 remotely, allowing the user 150 to monitor and manage the energy system 300 even when geographically distant from the system 100. In other examples, the user interface 160 may be a computer, connected to the system controller 300 via a virtual network computing session. Alternatively, the user interface 160 may have a wired connection and/or be geographically local to the system controller 300. For example, the user interface 160 may be a touchscreen hard-wired to the controller 300 in the residential site or vehicle of the system 100.

While a specific system controller is shown, any appropriate hardware or software architecture may be employed. For example, communication with the user device may be via a wired network connection.

The methods, systems and system controllers described above may be used similarly for managing consumption of other utilities, such as water or gas. For example, usage and refilling of a domestic water tank may be controlled so as to minimise non-renewable energy consumption, or renewable energy may be optimally used instead of gas, such as in heating systems.

The above embodiments and examples are to be understood as illustrative examples. Further embodiments, aspects or examples are envisaged. It is to be understood that any feature described in relation to any one embodiment, aspect or example may be used alone, or in combination with other features described, and may also be used in combination with one or more features of any other of the embodiments, aspects or examples, or any combination of any other of the embodiments, aspects or examples. Furthermore, equivalents and modifications not described above may also be employed without departing from the scope of the invention, which is defined in the accompanying claims.

The invention claimed is:

1. A method for managing an energy system having one or more renewable energy sources, one or more energy storage devices, one or more loads, and a connection for connecting at least temporarily to an external non-renewable energy source, the method comprising the steps of:
generating a prediction of energy demand of the loads using historical energy demand data;
generating a prediction of renewable energy availability from the renewable energy sources using weather forecast data;
determining an amount of energy to be obtained from the external non-renewable energy source in dependence on the prediction of renewable energy availability and the prediction of energy demand;
generating an energy conservation strategy to minimise use of the external non-renewable energy source using the predictions and determined energy amount, the energy conservation strategy comprising:
i) generating a load-shedding strategy comprising periods of interruption of energy supply to the one or more loads; and
ii) generating, based on the determined amount of energy to be obtained from the external non-renewable energy source, a charge plan for charging the one or more energy storage devices, the charge plan specifying one or more charging sources and/or charging times for charging the one or more energy storage devices in order that a) a minimum charge level to be maintained for the one or more energy storage devices, b) a required charge level to be achieved for the one or more energy storage devices, wherein the required charge level is to be achieved at least once in a given time period, wherein the charge plan is generated based on an energy storage device charging constraint related to battery health and/or wherein the charge plan is generated based on the prediction of renewable energy availability extending beyond 24 hours; and
adjusting energy supplied to one or more of the energy storage devices and/or one or more of the loads automatically according to the energy conservation strategy.

2. The method according to claim 1, wherein the prediction of renewable energy availability is determined based on past observed energy availability data obtained for the one or more renewable energy sources.

3. The method according to claim 2, wherein generating a prediction of renewable energy availability comprises:
determining one or more prediction parameters for a given future time period using the weather forecast data; and
determining an energy availability value for the given future time period based on the prediction parameters and based on the past observed energy availability data.

4. The method according to claim 3, wherein the prediction parameters comprise one or more of:
one or more time parameters corresponding to the given future time period, the one or more time parameters indicating a season, a month, and/or time of day; and
one or more weather parameters derived from the weather forecast data, one or more weather parameters indicative of cloud cover, sunshine duration, sunshine amount, and/or rainfall.

5. The method according to claim 3, comprising deriving the energy availability value from one or more past observed energy availability values associated with prediction parameter values corresponding to the determined prediction parameter values.

6. The method according to claim 3, comprising associating past observed energy availability values with respective data buckets, each data bucket associated with a respective range of one or more prediction parameters.

7. The method according to claim 6, comprising identifying a data bucket matching the determined prediction parameters, comprising one or more of time parameters and weather parameters respectively corresponding to the given time and weather forecast data for the given time, and determining the predicted energy availability value for the given time based at least on past observed energy availability values associated with the identified data bucket.

8. The method according to claim 7, comprising determining if the identified data bucket is associated with a threshold number of past observed availability values, and:
if so, using the past observed availability values to determine a prediction; if not, using an alternative prediction method.

9. The method according to claim 8, wherein the alternative prediction method:
uses a predetermined prediction model comprising a predetermined prediction formula, and/or
does not use past observed energy availability data.

10. The method according to claim 1, wherein the prediction of renewable energy availability is determined using a predetermined prediction model comprising a prediction formula.

11. The method according to claim 10, wherein the model or formula is parameterised by one or more configurable model parameters configurable via user input.

12. The method according to claim 11, wherein the model parameters include one or more weather parameters, wherein each weather parameter is indicative of a degree of dependency of available renewable energy on a weather state.

13. The method according to claim 11, wherein the step of generating the prediction of renewable energy availability comprises:
providing the model parameters to the energy prediction model, wherein the renewable energy prediction model receives as input the weather forecast data and provides as output the prediction of renewable energy availability.

14. The method according to any of claim 10, further comprising the steps of:
comparing the prediction of renewable energy availability with historical renewable energy data; and
adjusting the model parameters based on the comparison of the prediction of renewable energy availability with the historical renewable energy data.

15. The method according to claim 1, further comprising the steps of:
performing an inference based on historical user inputs and historical circumstance data; and
updating the energy conservation strategy based on the inference; wherein the historical circumstance data comprises one or more of:
historical energy demand data;
historical weather data; and
historical renewable energy data.

16. The method according to claim 1, further comprising the steps of:
receiving one or more inputs from a user via a user interface; and updating the energy conservation strategy based on the inputs received from the user.

17. The method according to claim 1, wherein determining an amount of energy to be obtained from the external non-renewable energy source comprises determining the amount such that the energy obtained from the external non-renewable energy source and the energy obtained from the renewable energy sources as determined from the prediction of renewable energy availability together meet the predicted energy demand.

18. The method according to claim 1 wherein the charge plan specifies one or more of:
- the amount of energy to be obtained from the external non-renewable energy source for charging the one or more energy storage devices;
- a charging duration for charging the one or more energy storage devices from the external non-renewable energy source; and
- a time at which to perform charging of the one or more energy storage devices from the external non-renewable energy source.

19. The method according to claim 18, comprising determining the charge plan further based on a charging constraint comprising:
- one or more time windows during which energy may be obtained from the external non-renewable energy source, wherein the charging constraint is user-configurable.

20. The method according to claim 1, wherein generating the energy conservation strategy further comprises:
selecting, for a given load, one of:
- an energy supply source to be used to provide energy to the load, the supply source selected, primarily, as the one or more energy storage devices; or
- the external non-renewable energy source, wherein the adjusting step comprises controlling the energy system to provide energy to the given load from the selected supply source;

wherein the selection is made in dependence on an energy supply constraint associated with the one or more energy storage devices, the energy supply constraint comprising a power supply limit of a power inverter adapted to supply electrical power to loads of the energy system from the energy storage devices; and wherein the selection is made further in dependence on the prediction of energy demand, the method comprising selecting one or more loads to which energy is to be supplied from the external non-renewable energy source instead of the energy storage devices only during a time when the predicted energy demand indicates a required power flow exceeding a power supply limit associated with the one or more energy storage devices.

21. The method according to claim 1, comprising implementing the energy conservation strategy and the charge plan by controlling one or more loads and/or one or more energy storage controllers for controlling storage of energy to the one or more energy storage devices and/or one or more power inverters for providing energy from the one or more energy storage devices and/or energy input from the external non-renewable energy source based at least on the energy conservation strategy and the charge plan, wherein implementing the charge plan comprises controlling one or more control devices to perform charging of the one or more energy storage devices from the external non-renewable energy source in accordance with the charge plan.

* * * * *